Dec. 3, 1968 G. KLEIN ET AL 3,414,662
SUPERCONDUCTIVE ELECTRIC CABLE
Filed Nov. 10, 1966 2 Sheets-Sheet 2

# United States Patent Office 3,414,662
Patented Dec. 3, 1968

3,414,662
SUPERCONDUCTIVE ELECTRIC CABLE
Georges Klein, Paris, and Edmond Kloeckner, Bures-sur-Yvette, France, assignors to Compagnie Genérale d'Electricite, Paris, France
Filed Nov. 10, 1966, Ser. No. 593,358
Claims priority, application France, Nov. 10, 1965, 38,009
13 Claims. (Cl. 174—15)

ABSTRACT OF THE DISCLOSURE

This application describes a cable construction including a cable core comprising a stacked alternate arrangement of conductive bands and insulating bands, which stack is supported within a duct carrying a cryogenic fluid capable of contacting directly at least portions of the conductors. Surrounding the fluid carrying duct is a thermally insulating envelope. The individual conductors of each stack carry current in a direction opposite to the current flowing in the two conductors adjacent thereto so that the resultant field generated thereby is maintained below the critical value at which the superconductive properties of the conductor may be undesirably affected by this field. Direct currents as well as alternating and multi-phase currents may also be advantageously transmitted by this cable.

---

The cable in accordance with the present invention is constituted by a core comprising a plurality of superconductive bands which are stacked parallelly to each other and insulated from each other, and which are connected in a manner such that each band carries electric current in a direction opposite to that of the current which flows in the two adjacent bands in the stack. In other words, the odd-numbered bands in the stack transport a current in a given direction, and the even-numbered bands in the stack transport a current in the opposite direction.

Now, it is known that for a given material at a given temperature the superconductive condition of this material ceases if the magnetic field to which it is subjected reaches or exceeds a specific critical value.

Thus, the arrangement in accordance with the invention essentially provides the effect that the magnetic field in proximity to each band is the resultant of the magnetic field which is produced by the current flowing therethrough and of the magnetic fields of opposite sense which are produced by the currents in the adjacent bands, so that the field of each band is reduced by the fields of the adjacent bands. This resultant field is thus considerably weaker than it would be if the currents flowed in the same direction in all of the bands, since this resultant field would then be the arithmetic sum of the partial fields derived from the different bands.

It should therefore be apparent that a cable which is constituted as has been set forth hereinabove insures preservation of the superconductive condition of the conductors by limiting the field generated thereby and therefore allows for transporting currents having a much greater intensity than a conventional superconductive cable, all conditions otherwise being the same.

This result may also be obtained by utilizing concentric insulated tubular conductors, the cooling of a cable thus constructed being realized by placing it into a duct or line in which a cryogenic liquid is caused to circulate so as to penetrate also to the inside of the tubular construction. However, cables of this type have a number of disadvantages. They have an asymmetrical construction, are difficult to make, and do not permit the cryogenic liquid to directly bathe the conductors.

The superconductive cable as proposed by the present invention renders it possible to eliminate these disadvantages and drawbacks.

The invention is characterized in that the cable is constituted of a stack of superconductive bands which are separated from each other by insulating tapes, the entire stacked group being enclosed within a duct or line in which flows a cryogenic liquid. The particularly advantageous feature of the invention resides in the arrangement of the superconductive bands in such a manner that this liquid is in contact with at least a part of the surface of the superconductive bands, the aforementioned duct or line, in turn, being enclosed in a thermally insulating envelope.

In accordance with the advantageous embodiment of the cable as proposed by the present invention, the insulating strips which separate two superconductive bands have a width greater than that of the bands so as to project beyond the sides of the latter to thereby increase the "clapping distance" between two adjacent bands.

The superconductive bands may be made from a superconductive metal, such as niobium, or from a flexible material coated or covered with a superconductive material, for example, a steel band plated with niobium or lead, or a band from a material such as "Mylar" coated with lead.

It is proposed by the present invention to provide a superconductive cable capable of transmission of powers of from 100 to 1000 megawatt of either direct current or alternating current at voltages preferably higher than 10 kilovolts.

For the purpose of obtaining the best possible transmission characteristics with such a cable, it is also an object of the present invention to provide a cable construction of the type described herein which allows for a direct cooling of the conductor of conductors within the cable by intimate contact between the cooling fluid and the conductors.

It is another object of the present invention to provide a cable whose central portion may be readily wound on a reel in order to facilitate the transport and seating thereof.

Finally, it is a general object of the present invention to provide a superconductive cable which satisfies the requirements indicated above, and substantially eliminates the drawbacks inherent in known devices of a similar nature.

These and other objects, features and advantages of the present invention will become more apparent from the following detailed description of the invention when taken in conjunction with the accompanying drawings, which illustrate several embodiments of the invention, and wherein.

Figure 1:
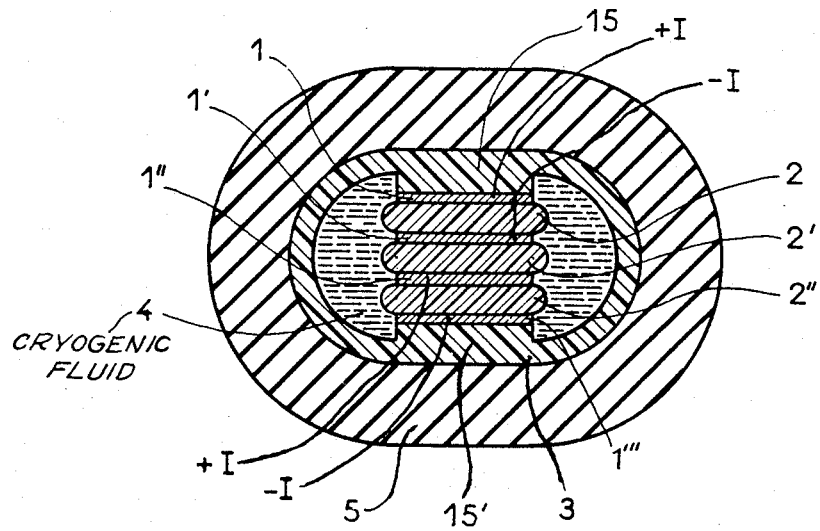
FIGURES 1, 2 and 3 are transverse cross-sectional views of cables in accordance with three embodiments of the present invention, utilized with direct current.

In FIGURE 1, reference symbols 1, 1', 1" and 1''' designate conductive bands made from superconductive material, while reference symbols 2, 2' and 2" are the intermediary insulating bands arranged in alternate stacked relationship with the conductive bands.

The stack or group which is obtained in this manner is placed into a duct or line 3 made from a plastic, electrically insulating material in which a cryogenic liquid 4 circulates, for example, liquid helium. This stack or group of conductive bands and insulating bands is clamped between two diametrically opposed internal expansion members 15 and 15' formed as integral members of the duct or line 3.

Finally, the duct or line is thermally insulated by means of an envelope 5 which is constituted in a manner known per se or layers made from superinsulating thermal materials and also of layers which are devoid of air; and these layers may comprise, moreover, an enclosure for the flop of a cryogenic gaseous fluid therein, such as supercooled gaseous helium. Two superconductive bands such as 1 and 1' carry currents in opposite directions indicated by +I and —I in the figure for the purpose of effectively reducing the field generated thereby, as indicated above.

Figure 2:
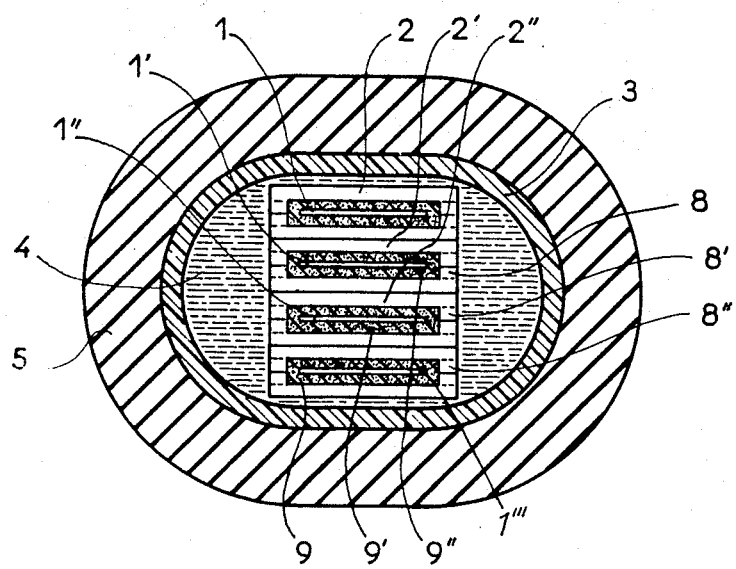

FIGURE 2 illustrates another embodiment of the cable according to the present invention in which the conductors are not clamped in between the insulating strips, thereby avoiding the mechanical stresses due to different contractions of the conductor and of the insulator when being cooled. For this purpose, the insulating strips are split and assembled in pairs in such a manner as to form a kind of channel or groove into which the superconductive band is freely placed either bare or enveloped in a packing such as resilient packing 9, 9', 9'' made from spongey material.

Openings 8, 8', 8'' are selectively provided in spaced relationship on the individual strip portions of the profiled insulating strips in order to allow the cryogenic liquid to penetrate into the insulating channel and to thus directly bathe the conductor which is positioned therein. As in the first embodiment, the duct or line 3 is protected thermally by means of an envelope 5 made from a superinsulating thermal material.

Figure 3:
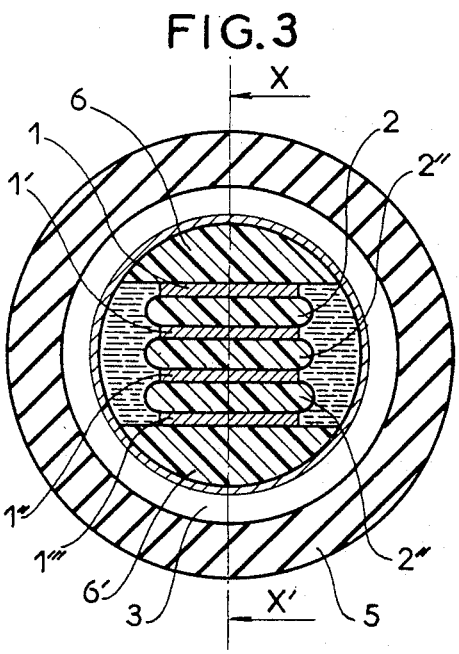
Figure 4:
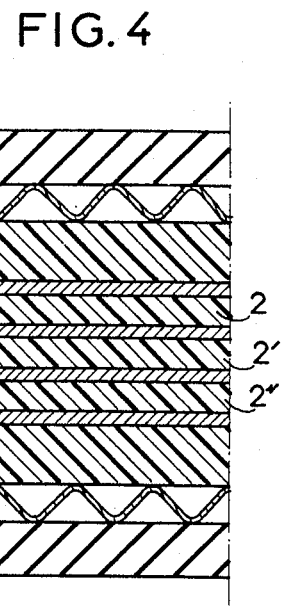
FIGURE 4 is a longitudinal cross-sectional view through a cable taken along line X—X of FIGURE 3, and FIGURES 5 and 6 illustrate cable cores for transmission of alternating current.

FIGURES 3 and 4 are, respectively, a horizontal cross-sectional view of a longitudinal cross-sectional view through a cable which is analogous to that shown in FIGURE 1, but wherein the duct or line 3 is metallic and constituted, for example, of an aluminum tube being undulated, as seen in FIGURE 4, so as to increase the flexibility of the cable. The extreme conductors 1 and 1''' are insulated in this case from the duct or line by the opposed insulating blocks 6 and 6'.

The three embodiments of the cable as proposed above in accordance with the present invention assure a good refrigeration of the conductors by virtue of the direct contact between the superconductive material and the cryogenic liquid.

The cables according to the present invention may also be utilized for transmission of alternating current, on condition that a superconductive material is employed whose alternating current losses are sufficiently low. The cables as proposed by the present invention may be employed for the transmission of polyphase currents. In the case of triphase currents, the cable will comprise a number of superconductive bands in a multiple of 3 (or 4, if one is neutral).

Figure 5:
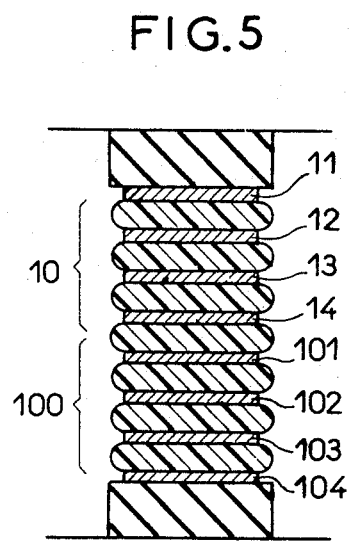

FIGURE 5 is a cross-sectional view, given by way of example, through the core of a cable according to the present invention which comprises two triphase circuits with neutral combinations 10 and 100, respectively, each being made of four conductors. The conductors are positioned one below the other so that the conductors having different phases are oriented in such a manner that the superconductor is subjected to a magnetic field which is as weak as possible. In FIGURE 5, reference numerals 11 and 101 designate two conductors in phase, each corresponding to one of the respective circuits; reference numerals 12 and 102 designate conductors of the second phase in each of the circuits, etc., reference materials 14 and 104 identifying the neutral conductors of the two circuits.

Figure 6:
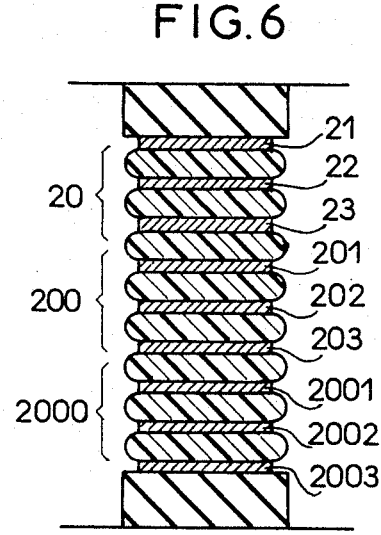

FIGURE 6 illustrates the core of a cable comprising three triphase circuits 20, 200 and 2000 without neutral conductors. Here again, adjacent conductors do not transmit currents in phase, but rather transmit dephased currents of $2\pi/3$. Reference numerals 21, 201 and 2001 are indicative of phase 1 of each circuit; reference numerals 22, 202 and 2002 provide phase 2, and reference numerals 23, 203 and 2003 provide phase 3.

In accordance with a modified embodiment of the cables as proposed by the present invention, the conductors may also be arranged in several groupings or stacks disposed parallelly; however, the regulations relative to alternation as set forth hereinabove must be followed.

On the basis of calculations which are given by way of example, it will now be shown that a cable having the structure proposed by the present invention allows for transmission of power in the order of from 100 to 1000 megawatt while utilizing a core having a cross section sufficiently slight that it may be wound on a reel of conventional diameter.

If $js$ is the linear density of admissible current in the superconductor, $d$ the width of the superconductive band being employed and $2n$ the total number of bands, the total current I which is transported will be $I=njsd$.

The voltage gradient near the edges of the conductor must be kept lower than the ionization potential of the refrigerating fluid in the conditions of use or application thereof. If this condition is met, the operating voltage will be in a first approximation proportional to the width of the insulator, or $U=Ee$, wherein E designates the maximum value of the electric field admitted into the dielectric, and $e$ the width of the insulating layer. The power being transported in direct current is $$P=UI-jsEned.$$

Since the volume of the conductor is slight in comparison to that of the insulator $ned$ represents the cross-section S of the cable and one thus has $P=jsES$ at average voltages. This ratio shows that the power being transported by the line is proportional to the cross-section of the cable.

For a niobium band, one has for example $$js=1.5 \ 10^5 A./m.$$

If the insulator is made from Teflon, one has $E=10^7$ v./m. With a cable core having a cross-section of $10^{-2}m.^2$, according to the above relationship, one may transmit a power substantially equal to $$P=1.5\times10^5\times10^7\times10^{-2}=1.5 \ 10^{10} \text{ w. for } I \text{ dm. 2}$$

One may reduce this value to $1.10^{10}$ w./dm.2 in order to take into account factors which have been neglected in the calculation or $10^4$ mw./dm.2. The apparent density of the current $ja$ in the cable is close to $$ja=\frac{js}{e}=js\frac{E}{U}$$

It is inversely proportional to the working voltage. For $U=20$ kv., one obtains, for the example under consideration, $$ja=\frac{1.5 \ 10^5 \times 10^7}{2 \ 104}=7.5 \text{ A./m.2}=75 \text{ A./mm.2}$$

In order to realize the transmission of a power of 150 mw. at a voltage of 20 kv., a core is required which has a cross-section of 100 mm.2 since the current for a conductor of this size is 7500 A. One may take $d=2.5$ cm. and $n=2$ and the total width of the insulator will then be 1 cm. As a matter of fact, it is sensible design to provide at least 2 mm. of insulating width between conductors.

In order to realize the transmission of 600 mw. at 20 kv., a core having a cross-section of 400 mm.2 is required since the current for a conductor of this size is 30,000 A. One may take $d=5$ cm., $n=4$ and a total insulator width of 1.8 cm.

These two examples show that it is possible to wind the cables on conventional reels having a diameter of several meters.

We claim:
1. A superconductive electric cable comprising
   a plurality of superconductive bands and a plurality of insulating strips arranged in alternate stacked relationship forming a core group, and
   a hollow duct surrounding said core group and having a cryogenic fluid circulating therein,
   said insulating strips being oriented in said core group with respect to adjacent superconductive bands so that at least a portion of each band is exposed to said cryogenic fluid.
2. The combination defined in claim 1 wherein said insulating strips contact adjacent bands so as to leave the sides of said bands exposed to said cryogenic fluid.
3. The combination defined in claim 1 wherein said insulating strips have a width greater than that of the superconductive bands.
4. The combination defined in claim 1 wherein said insulating strips are profiled in pairs of adjacent strips to cooperate to form a channel in which a superconductive band is accommodated, said strips being provided with orifices allowing said cryogenic fluid to penetrate to the surface of said bands.
5. The combination defined in claim 4 wherein each superconductive band is enveloped in a spongey material within the groove in said strips.
6. The combination defined in claim 1 wherein said duct is made of an insulating material.
7. The combination defined in claim 1 wherein said duct is formed of a metal pipe.
8. The combination defined in claim 7 wherein said metal pipe has undulating walls.
9. The combination defined in claim 1 wherein said bands are made entirely of superconductive metal.
10. The combination defined in claim 1 wherein said bands are made of a support coated with a superconductive metal.
11. The combination defined in claim 10 wherein said support is made of a metallic non-superconductive material.
12. The combination defined in claim 10 wherein said support is made of organic plastic material.
13. The combination defined in claim 1 wherein said insulating strips are made of polytetrafluoroethylene.

References Cited

UNITED STATES PATENTS

| | | | |
|---|---|---|---|
| 3,281,737 | 10/1966 | Swartz | 335—216 |
| 2,440,668 | 4/1948 | Tarbox | 174—15 |
| 3,043,901 | 7/1962 | Gerwing et al. | 174—15 |

LEWIS H. MYERS, *Primary Examiner.*

A. T. GRIMLEY, *Assistant Examiner.*